US012789028B2

(12) United States Patent
Golinveaux et al.

(10) Patent No.: US 12,789,028 B2
(45) Date of Patent: Nov. 10, 2026

(54) FIRE PROTECTION SPRINKLER HAVING GRADIENT MATERIAL COMPONENTS AND METHODS OF EVALUATING CORROSIVE ENVIRONMENT USE

(71) Applicants: Viking Group, Inc., Caledonia, MI (US); Minimax Viking Patent Management GmbH, Bad Oldesloe (DE)

(72) Inventors: James E. Golinveaux, Ada, MI (US); Scott T. Franson, Hastings, MI (US)

(73) Assignees: Minimax Viking Patent Management GmbH, Bad Oldesloe (DE); Viking Group, Inc., Caledonia, MI (US)

(*) Notice: Subject to any disclaimer, the term of this patent is extended or adjusted under 35 U.S.C. 154(b) by 4 days.

(21) Appl. No.: 18/887,690

(22) Filed: Sep. 17, 2024

(65) Prior Publication Data

US 2025/0099795 A1 Mar. 27, 2025

Related U.S. Application Data

(63) Continuation of application No. 15/734,944, filed as application No. PCT/US2020/017000 on Feb. 6, 2020, now Pat. No. 12,115,400.
(Continued)

(51) Int. Cl.
*B05D 7/16* (2006.01)
*A62C 35/68* (2006.01)
(Continued)

(52) U.S. Cl.
CPC .............. *A62C 35/68* (2013.01); *A62C 37/11* (2013.01); *B05D 7/16* (2013.01); *C09D 5/08* (2013.01); *C22C 38/44* (2013.01); *B05D 1/18* (2013.01)

(58) Field of Classification Search
CPC .... B05D 7/16; B05D 1/18; C09D 5/08; C22C 38/44
See application file for complete search history.

(56) References Cited

U.S. PATENT DOCUMENTS 4,347,172 A 8/1982 Nishida et al.
5,385,758 A 1/1995 Ahmed
(Continued)

FOREIGN PATENT DOCUMENTS

WO WO 2008/003273 1/2008

OTHER PUBLICATIONS

Minimax Viking Research & Development GmbH, Extended European Search Report issued in corresponding European Application No. 20753143.5 on Oct. 10, 2022, 9 pages.
(Continued)

*Primary Examiner* — Hai Y Zhang
(74) *Attorney, Agent, or Firm* — Ashurst Perkins Coie US LLP

(57) ABSTRACT

Fire protection sprinkler assemblies and methods of use in corrosive environments. The sprinkler assemblies include a corrosion resistant sprinkler frame made of a gradient material. The gradient material includes a polymeric layer interlocked about a corrosion-prone core in order to protect the frame structure from a corrosive environment. The interlock between the core and the protective polymer layers are defined by ionic bonding between the core and the outer polymer layer.

12 Claims, 7 Drawing Sheets

Related U.S. Application Data

(60) Provisional application No. 62/803,054, filed on Feb. 8, 2019.

(51) Int. Cl.

| | |
|---|---|
| ***A62C 37/11*** | (2006.01) |
| ***C09D 5/08*** | (2006.01) |
| ***C22C 38/44*** | (2006.01) |
| *B05D 1/18* | (2006.01) |

(56) References Cited

U.S. PATENT DOCUMENTS

| | | | | |
|---|---|---|---|---|
| 5,576,207 | A | 11/1996 | Reid et al. | |
| 5,669,449 | A | 9/1997 | Polan et al. | |
| 6,345,632 | B1 | 2/2002 | Ludwig et al. | |
| 6,355,354 | B1 | 3/2002 | Bell et al. | |
| 8,518,493 | B2 | 8/2013 | Abu-Shanab et al. | |
| 9,539,610 | B2 | 1/2017 | Wasserfallen et al. | |
| 9,962,569 | B2 | 5/2018 | Roenpagel et al. | |
| 10,413,765 | B2 | 9/2019 | Roenpagel et al. | |
| 12,115,400 | B2 | 10/2024 | Franson et al. | |
| 2008/0060215 | A1 | 3/2008 | Reilly et al. | |
| 2008/0308285 | A1 * | 12/2008 | Su .......................... | A62C 37/11 239/522 |
| 2011/0003161 | A1 * | 1/2011 | Abu-Shanab .......... | B05D 7/542 427/353 |

OTHER PUBLICATIONS

International Searching Authority, International Search Report and Written Opinion in International Appln. No. PCT/US2020/017000, May 7, 2020, 15 pages.

Henkel Corporation, Bonderite, Functional Coatings Solutions Guide, 594832/LT-8299, Oct. 2017, 68 pages.

FM Global, Corrosion and Corrosion Mitigation in Fire Protection Systems, Su et al, 2nd edition, Jul. 2014, Project ID 0003040794, 98 pages.

* cited by examiner

FIRE PROTECTION SPRINKLER HAVING GRADIENT MATERIAL COMPONENTS AND METHODS OF EVALUATING CORROSIVE ENVIRONMENT USE

PRIORITY CLAIM & INCORPORATION BY REFERENCE

This application is a continuation of U.S. patent application Ser. No. 15/734,944, filed Dec. 3, 2020, now U.S. Pat. No. 12,115,400, granted Oct. 15, 2024, which is a 35 U.S.C. § 371 application of International Application No. PCT/US2020/017000, filed Feb. 6, 2020, which claims the benefit of U.S. Provisional Application No. 62/803,054 filed Feb. 8, 2019, each of which is incorporated by reference in its entirety.

TECHNICAL FIELD

The present invention relates generally to fire protection sprinklers suitable for use in corrosive environments. More specifically, the present invention is directed to a fire protection sprinkler assembly having components fabricated from a core material of inadequate corrosion resistance with an ionically bonded outer protective layer. The present invention also provides performance testing to demonstrate suitability for use in a corrosive environment.

BACKGROUND ART

Generally, automatic fire protection sprinklers include a solid metal frame and some type of fluid deflecting member or deflector to distribute fluid discharged from the body in a defined spray distribution pattern over an area to address a fire. Fluid discharge from an automatic fire protection sprinkler is automatically controlled, typically, by passive activation of a heat-responsive actuator, such as a frangible fluid filled glass bulb or a soldered mechanical assembly that, in its unactuated state, maintains a fluid tight seal at the discharge orifice by the exertion of pressure on a cap (button or disc) or other sealing assembly; and in an actuated state, fractures or collapses to release the sealing assembly. An automatic fire protection sprinkler can also or alternatively be configured for automatic controlled activation by a signal-responsive actuator, such as, and electrical and/or optical signal. Automatic sprinklers are used in a variety of environments that can expose the sprinkler to corrosive conditions. Over time, corrosive effects can damage the sprinkler including the frame, which can prevent or interfere with the proper sprinkler operation. Sprinkler frames can be fabricated from materials of varying corrosion resistance. Corrosion resistant materials can include, for example, brass, lead or stainless steel. To provide additional protection against corrosive effects, sprinkler frames alone or along with the other sprinkler components can be treated with a protective finish or coating.

Fire protection sprinklers for use in corrosive environments are generally subject to industry accepted fire code requirements and the approval of the "authority having jurisdiction" (AHJ) to ensure compliance with the applicable codes and requirements. One manner of satisfying the applicable requirements, is by identification of fire protection sprinklers that have demonstrated satisfactory fire protection performance under appropriate industry accepted corrosion and operational testing. To facilitate the AHJ approval process, fire protection equipment can be "listed," which as defined by the National Fire Protection Association (NFPA) in its publication, "NFPA 13: Standard for the Installation of Sprinkler Systems" (2019), means that the equipment is included in a list by an organization that is acceptable to the AHJ and whose list states that the equipment "meets appropriate designated standards or has been tested and found suitable for a specified purpose." Industry recognized listing organizations include: Underwriters Laboratories Inc. ("UL") and FM Approvals LLC ("FM").

In its publication, "UL Standard for Safety for Automatic Sprinklers for Fire-Protection Service UL 199" (11th ed. 2005, rev. 2017) ("UL 199"), UL provides corrosive exposure testing for automatic fire protections sprinklers intended to operate in corrosive environments. Similar testing standards are provided in the following FM publications: (i) "Approval Standard for Automatic Sprinklers for Fire Protection—Class Number 2000" (February 2018) ("FM 2000"); (ii) "Approval Standard for Quick Response Storage Sprinklers for Fire Protection—Class Number 2008" (February 2018) ("FM 2008"); or (iii) "Approval Standard for Residential Sprinklers for Fire Protection—Class Number 2030" (August 2009) ("FM 2030"). In addition to the corrosion testing, the listing standards include other exposure tests in order to establish a sprinkler's suitability for use in a corrosive environment. Other exposure tests include, for example, high temperature testing, temperature cycling, vibration testing, freezing testing, evaporation testing for coatings, moist air testing, and/or hydrocarbon exposure testing. Accordingly, to provide a commercially viable sprinkler for use in a corrosive environment, the sprinkler is appropriately performance tested for the environment of intended use.

Generally, the corrosive exposure tests include exposing one or more sample sizes of a sprinkler for a period of time to a corrosive environment and subsequently testing the exposed sprinklers for acceptable performance. The corrosive testing environments include, for example, the following: a salt spray fog, a hydrogen sulfide atmosphere, and a carbon dioxide-sulfur dioxide atmosphere. The internal passageways of the test sprinklers are filled with de-ionized water and their inlets sealed for the period of exposure. The period of exposure is one or both of a ten day (10-day) period and thirty day (30-day) period. Following the period of exposure, the test sprinklers are tested for operation within defined parameters to determine whether or not the tested sprinkler is suitable for use in a corrosive environment. In particular, the exposed sprinklers are to be tested to verify that their designed or stated thermal sensitivity remains within acceptable levels. In order to satisfy the 10-day test, the tested sprinkler samples are thermally operated to verify that average time to operation following the 10-day exposure has not exceeded more than 1.3 times the time to operation for the same sprinkler not exposed to the test environment. Similarly, in satisfaction of the 30-day test, the tested sprinkler samples are thermally operated to verify that average time to operation following a 30-day exposure has not exceeded more than 1.3 times the time to operation for the same sprinkler not exposed to the test environment.

In the salt spray corrosion exposure test, the sprinkler samples are exposed to a salt spray or fog as specified in a Standard Practice for Operating Salt Spray (Fog) Testing Apparatus, ASTM B117, with the salt solution consisting of twenty percent (20%) by weight of common salt (sodium chloride). In the hydrogen sulfide exposure test, a moist hydrogen sulfide air mixture is provided in a closed glass chamber maintained at about 75° F. (24° C.) in which an amount of hydrogen sulfide equivalent to one percent (1.0%) of the volume of the chamber is introduced into the chamber on five out of every seven days of the period of exposure with the prior day's air mixture being purged from the chamber prior to introduction of new volume. To maintain the humidity of the chamber, an amount of water equivalent to 10 ml/0.003 $m^3$ of chamber volume is maintained at the bottom of the chamber. In the carbon dioxide-sulfur dioxide exposure test, a moist carbon dioxide-sulfur dioxide air mixture is provided in a closed glass chamber maintained at about 75° F. (24° C.) in which an amount of carbon dioxide equivalent to one percent (1.0%) of the volume of the chamber plus an amount of sulfur dioxide equivalent to one percent (1.0%) of the volume of the chamber is introduced into the chamber on five out of every seven days of the period of exposure with the prior day's air mixture being purged from the chamber prior to introduction of new volume. To maintain the humidity of the chamber, an amount of water equivalent to 10 ml/0.003 $m^3$ of chamber volume is maintained at the bottom of the chamber.

In addition to impacting the proper thermal responsiveness of a sprinkler, a corrosive environment can adversely impact the structure of the sprinkler itself and/or one or more of its constituent parts. Accordingly, the corrosive exposure tests include stress corrosion cracking tests in which one or more sample sizes of a sprinkler are exposed for a period of time to a corrosive environment of, for example, either a moist ammonia-air mixture or a magnesium chloride solution. Following the period of exposure, the test sprinklers are examined under microscope for evidence of stress corrosion cracking including, for example, cracking, delamination or other degradation in order to determine whether or not the tested sprinkler is suitable for use in a corrosive environment. Depending upon the results of the microscopic examination, the sprinkler and/or its parts are operationally tested for compliance within defined parameters.

Selection of the corrosive environment for stress corrosion cracking exposure testing is a function of the material of the sprinkler parts, in particular, the sprinkler frame, to be tested. In a test for brass parts, a moist-ammonia-air mixture is maintained in a sealed glass chamber. The mixture consists of a sufficient amount of aqueous ammonia to cover the bottom of the chamber and having a specific gravity of 0.94 at an atmospheric pressure with a constant temperature of about 93° F. The sprinkler test samples are positioned within the chamber above the liquid surface and exposed for a period of ten (10) days. Following the exposure period, the test samples are examined under microscope. For any parts not showing cracking, delamination or other degradation, the samples pass the stress corrosion cracking. Any tested operating parts showing signs of degradation are operationally tested by demonstrating the ability to maintain a fluid tight seal under a hydrostatic pressure of 175 psig. and/or maximum design pressure for a duration of one minute and then properly operating under a minimum hydrostatic pressure of 7 psig. when thermally operated. For non-operating test parts showings signs of stress corrosion cracking or degradation, the parts are tested to demonstrate the ability to withstand flowing water at the rated pressure of the part for thirty (30) minutes. By passing the operational tests, the sprinkler parts satisfy the stress corrosion cracking testing requirements.

In a test for sprinkler stainless steel parts, a forty-two percent (42%) by weight magnesium chloride solution is maintained on a thermostatically-controlled electrically heated mantel within a sealed glass chamber fitted with a thermometer and a wet condenser. The solution is maintained at a boiling temperature of about 302° F. The sprinkler test samples are disassembled and the stainless steel parts are placed within the solution and exposed for a period of 150 hours when intended for normal use and exposed for 500 hours when intended for use without a corrosion resistant coating. Following the exposure period, the test samples are rinsed and examined under microscope. For any parts not showing cracking, delamination or other degradation, the samples pass the stress corrosion cracking. Any tested operating parts showing signs of degradation are to be reassembled in a sprinkler assembly and operationally tested by demonstrating the ability to maintain a fluid tight seal under the rated pressure of the test sprinkler for a duration of one minute and then properly operating under a minimum hydrostatic pressure of 7 psig. when thermally operated. For non-operating test parts showings signs of stress corrosion cracking or degradation, the parts are reassembled into a sprinkler assembly and tested to demonstrate the ability to withstand flowing water at the rated pressure of the part for thirty (30) minutes. By passing the operational tests, the sprinkler parts satisfy the stress corrosion cracking testing requirements.

Known coatings for sprinkler frames, for example, wax or Teflon, can degrade and/or separate from the sprinkler frame in the course of normal usage of the sprinkler, e.g., during manufacturing, shipping, handling, installing, actuating and exposure to environmental conditions. Accordingly, the stress corrosion cracking exposure tests evaluate the ability of sprinkler frames to structurally withstand a corrosive atmosphere without any plating or coating. The frames to be tested are therefore tested without any coating. Because the known stress corrosion cracking exposure testing requirements evaluate the sprinkler frame itself regardless of plating or coating of the sprinkler frame, a dilemma exists to provide commercially viable appropriate fabrication material options and/or corresponding standards for corrosion testing and fire protection sprinkler fabrication. As such, the universe of materials for fabricating a commercially viable automatic fire protection sprinkler are limited. Therefore, there remains a need to identify and expand the universe of materials for fabrication of automatic fire protection sprinklers to be used in corrosive environments and a need to develop appropriate performance testing methods for evaluating such automatic fire protection sprinklers for suitability in those corrosive environments.

DISCLOSURE OF INVENTION

Preferred embodiments of fire protection sprinkler assemblies and methods for use in corrosive environments are provided. The preferred sprinkler assemblies include a corrosion resistant sprinkler frame made of a preferred gradient material. Alternate embodiments of the sprinkler assembly include a corrosion resistant sprinkler frame and fluid deflecting member made of the preferred gradient material. The preferred gradient material includes a plurality of layers which combine to provide for corrosion resistance protection to the overall frame structure. Generally, the preferred gradient material includes a base layer or core and an outer protective layer. Preferred embodiments of a gradient material include a polymeric, preferably non-porous, layer that is interlocked at a microstructural level to a base layer or core that alone is corrosion-prone. As used herein, "corrosion-prone" means having little to no corrosion resistance so as to fail to satisfy one or more corrosion exposure tests. The preferred "interlock" between the core and the protective layer provides for a permanent bond. As used herein, "permanent bond" is defined as a bond between two or more components to form an assembly such that any successful attempt to remove or separate the components would require destruction of the assembly and the constituent components. Accordingly, in preferred embodiments of the sprinkler frame or components, the protective polymer layer cannot be removed or separated from the core without damaging the protective layer, the core or both.

In one preferred embodiment of a fire protection sprinkler, a gradient material frame includes a corrosion-prone core defining an inlet, an outlet, a passageway extending between the inlet and the outlet along a longitudinal sprinkler axis, and a pipe securement region cincturing at least a portion of the passageway. In the sprinkler assembly, a fluid deflecting member is coupled to the gradient material frame with a seal assembly disposed within the passageway proximate the outlet and a trigger assembly seated against the seal assembly between the sealing assembly and the fluid deflecting member. Preferred embodiments of the gradient material frame and methods of their formation include providing a steel sprinkler frame preferably made from an iron alloy core having any one of the following alloying elements nickel (Ni), molybdenum (Mo) or Chromium (Co) at less than 5% by weight. In a preferred embodiment of the gradient material frame, a preferably non-porous polymer layer is ionically bonded to the corrosion-prone core resulting in a transition region containing a portion of the corrosion-prone core and a portion of the polymer layer.

Preferred embodiments of providing the preferred frame includes permanently bonding a polymer layer to the steel core in an autodeposition process using a polymer emulsion bath. Autodeposition is a chemical process in which an organic polymeric emulsion chemically is deposited on the surface of a clean metal substrate. A preferred emulsion bath includes iron fluorides with polymer particles. In the preferred autodeposition process, the iron fluorides of the bath react with and polarize the preferred steel surface of the core resulting in the production of free iron ions from the core. The iron ions from the core and polymer particles from the bath attract and ionically bond to one another to cause the polymer particles to coagulate and settle within the microstructures of the surface of the steel core. The polymer particles continuously precipitate out of the emulsion and build upon one another to form the preferred protective layer upon the preferred steel core.

Another preferred method provides for a corrosion evaluated fire protection sprinkler. The preferred method includes providing a sprinkler frame formed of a gradient material having an iron alloy core, an outer polymer layer defining an external surface of the frame, and a transition bond region between the core and outer layer. The transition bond region includes a portion of the iron alloy core having a plurality of spaced apart structures defining a plurality of pores in between with a portion of the polymer layer filling the plurality of pores such that the polymer layer is permanently bonded to the iron alloy core. The preferred method includes satisfying a gradient material corrosion testing protocol of the sprinkler frame.

In yet another preferred method of fire protection for corrosive environments, the method includes obtaining a fire protection sprinkler having a sprinkler frame formed of a gradient material having an iron alloy core, an outer polymer layer defining an external surface of the frame, and a transition bond region between the core and outer layer. The preferred transition bond region includes a portion of the iron alloy core having a plurality of spaced apart structures defining a plurality of pores in between with a portion of the polymer layer filling the plurality of pores such that the polymer layer is permanently bonded to the iron alloy core. The preferred method also includes providing the sprinkler for use in a corrosive environment.

Preferred embodiments of a method for evaluating the corrosion resistance of the preferred gradient material sprinkler frame are also provided. Thus, the preferred sprinkler assemblies incorporating the preferred gradient material frame and preferred methods of corrosion resistant evaluation of the gradient material frame provide for a corrosion evaluated sprinkler assembly. In addition, the preferred corrosion evaluated gradient material frame can be evaluated for use in a high temperature environment using a preferred high temperature exposure test. Therefore, preferred sprinkler assemblies incorporating the preferred gradient material frame can also provide for a corrosion and high temperature evaluated sprinkler assembly.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
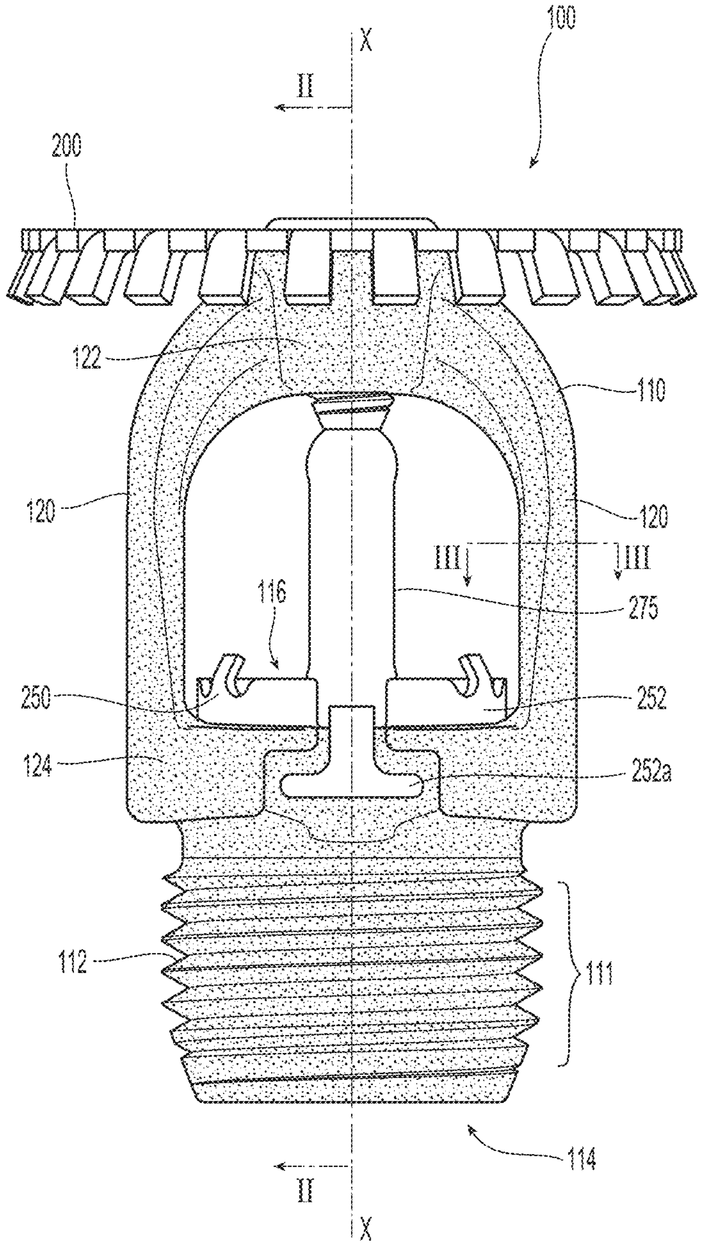
FIG. 1 is an illustrative view of a preferred corrosion resistant sprinkler assembly.
Figure 2:
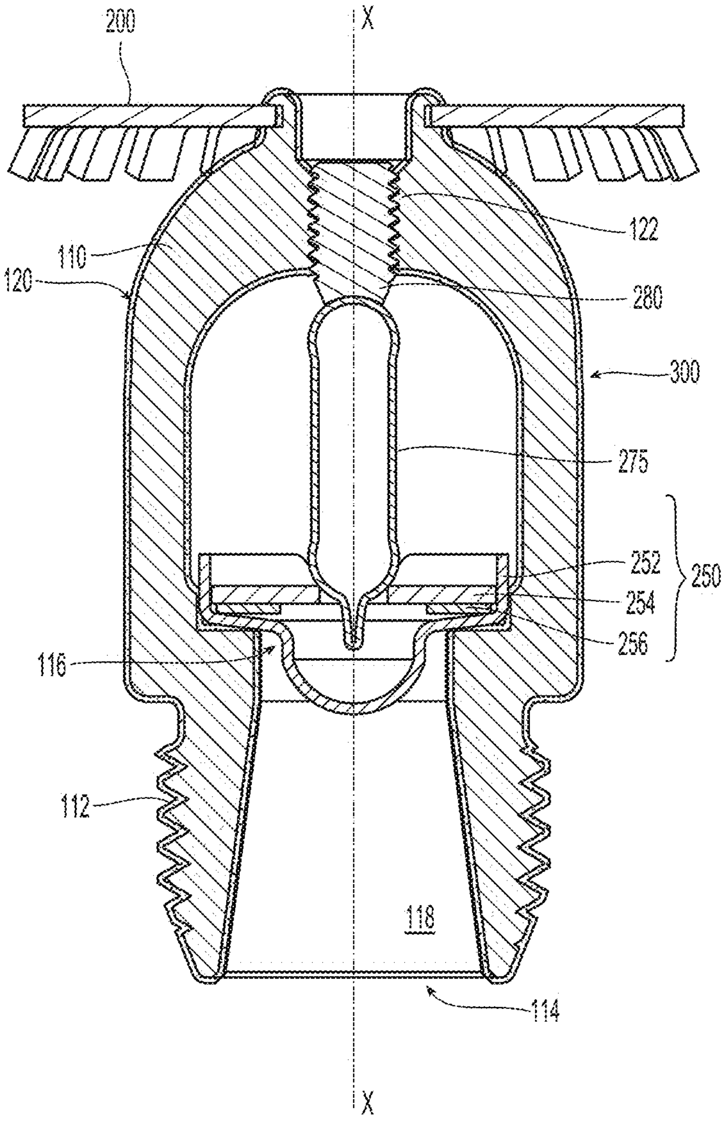
FIG. 2 is a cross-sectional view of the sprinkler assembly of FIG. 1.

Shown in FIGS. 1 and 2 are various views of an illustrative embodiment of a preferred corrosion resistant automatic fire protection sprinkler 100 that includes a gradient material sprinkler frame 110 having a body 112 with an inlet 114 and an outlet 116 with an internal passageway 118 extending between the inlet 114 and the outlet 116 along a sprinkler longitudinal axis X-X. In the embodiment shown, there are one or more support members or more preferably, one pair of frame arms 120 that extend axially from the body 112, preferably parallel to the sprinkler axis X-X and converge toward the sprinkler axis X-X—to form a sprinkler boss 122.

The sprinkler 100 includes a fluid deflecting member 200 located at a fixed distance from the outlet 116 for the distribution of firefighting fluid from a fluid supply pipe and discharged from the outlet 116 upon thermal actuation of the sprinkler 100 in order to address a fire. The fluid deflecting member or deflector can be fabricated and formed from brass or material of higher corrosion resistance such as, for example, nickel or stainless steel. In a preferred embodiment of the sprinkler assembly 100, the fluid deflecting member 200 is made of the same corrosion resistant gradient material of the frame 110 as described herein to contribute to the corrosion resistance of the sprinkler assembly. Preferably, the frame boss 122 engages and is affixed to the deflecting member 200 to centrally locate the deflecting member at the preferred fixed distance from the outlet 116. The sprinkler 100 and its deflecting member 200 are shown in an upright orientation, but it should be understood that the sprinkler 100 can be configured with an appropriate deflecting member for a pendent or horizontal orientation. Additionally, the frame 110 can be alternatively configured to adjustably locate the fluid deflecting member from the outlet by a translating member.

To facilitate securement of the sprinkler 100 to a fluid supply pipe, the sprinkler body 112 includes a wrench boss 124 with a perimeter configured for engagement by an installation tool, such as for example, a sprinkler installation wrench. The outer surface of the sprinkler body 112 is also configured with a securement region 111 for connecting the sprinkler 10 to the fluid supply pipe. For example, the pipe securement region can be configured as an external threaded region 111. To accommodate formation of the external thread while providing sufficient material thickness to the body 112, the securement region preferably cinctures at least a portion of the passageway 118. In an alternative configuration, the securement region can include an external groove for connection to a fluid supply pipe using a groove-type coupling.

Preferred embodiments of the sprinkler 100, are preferably configured as automatic sprinklers such that fluid discharge from the connected sprinkler 100 and its outlet 116 is controlled by a seal assembly 350 that is disposed within the passageway 118 proximate the outlet 116 as seen in FIGS. 1 and 2 to occlude the outlet 116. The illustrative seal assembly 250 shown includes a shell cap 252 with a seating disc 254 to enclose an annular spring disc 256 within the shell cap 352. The shell cap includes one or more legs 252*a* to fold over a preferably formed notch in the perimeter of the wrench boss 124 preferably centered between the frame arms 120. The seal assembly 350 is supported within outlet 116 of the sprinkler body 112 by a thermally responsive element or trigger 275 seated against the seating disc 254 and preferably aligned along the sprinkler axis X-X between the sealing assembly 250 and the deflector 200. The thermally responsive element 275 is preferably embodied as a thermally responsive frangible glass bulb but can be alternatively embodied as a thermally responsive mechanical or signal actuated assembly provided the assembly can seat and unseat the seal assembly 250 in respective unactuated and actuated states of the sprinkler. A load screw 280 is threaded into the boss 122 to provide a loading force against the thermally responsive element 275 and the seating disc 254 to compress the spring disc 256 such that the seal assembly 250 seats within the outlet 116 of the sprinkler body 112 to form a fluid tight seal. In the presence of a sufficient level of heat, the thermally responsive element 275 operates or triggers to release the sealing assembly 250 and permit the supplied fluid to discharge from the outlet 116 to impact the deflector 200 and address a fire.

Preferred embodiments of the sprinkler assembly 100 are corrosion resistant with the sprinkler frame 110 alone or in combination with the fluid deflecting member 200 are made of a gradient material in which one or more of its constituent layers individually or in combination with the other layers provide for corrosion resistance protection to the overall frame structure. Generally, the preferred gradient material includes a polymeric, preferably non-porous layer that is interlocked at a microstructural level with a base layer or core that otherwise alone would be susceptible to corrosion, i.e., corrosion-prone, when exposed to a corrosive environment. The preferred interlock of material provides for a preferred permanent bond between the core and the protective polymer layer. Accordingly, any successful attempt to remove or separate the permanently bonded protective polymer layer from the core in the sprinkler frame 110 would damage the frame 110 itself, the core and/or the protective layer.

The preferred gradient material provides for an alternate material for sprinkler frame or deflector fabrication over commonly used corrosion resistant materials, such as for example, brass, nickel or stainless steel which can provide corrosion resistance alone or in combination with a removable corrosion resistant coating or finish. Thus, the preferred gradient material expands the universe of materials from which to fabricate a commercially viable corrosion resistant sprinkler. The corrosion resistance of the preferred gradient material components is evaluated using preferred corrosion evaluation or testing methodologies or protocols as described herein. Thus, the preferred sprinkler assemblies incorporating the tested components can provide for a corrosion evaluated sprinkler assembly.

Figure 3:
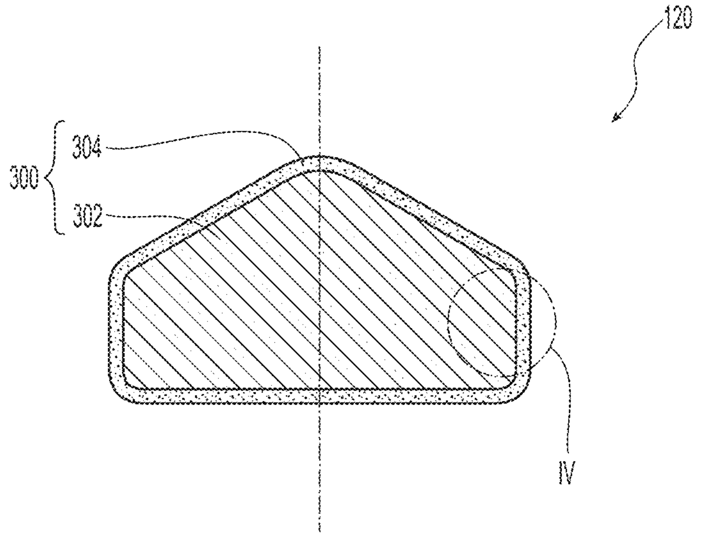
FIG. 3 is a detailed cross-sectional view of the sprinkler frame along line III-III in FIG. 1.

FIGS. 2 and 3 schematically illustrates the gradient material 300 of the sprinkler frame in which the frame is formed preferably from a corrosion-prone core material. In preferred embodiments, the core 302 is an iron alloy, such as for example steel, having any one of the following alloying elements nickel (Ni), molybdenum (Mo) or Chromium (Co) at less than 5% by weight. The protective preferably non-porous polymer layer 304 is preferably derived from an autodeposition composition in which a resin or polymer is stably suspended in an aqueous solution, emulsion or dispersion. Accordingly, as described herein, the preferred frame 110 is fabricated from an autodeposition process in which the frame structure is formed from the core material and bathed in the preferred polymer emulsion bath to build the polymer layer that interlocks at the microstructure level to the exposed surfaces of the core and then cured. Representative autodeposition bathing solutions are commercially available from Henkel Corporation of Rocky Hill, CT and described in their brochure, *Bonderite®: Metal Pretreatment, Cleaners, and Specialty Coatings—Functional Coatings Solutions* (2017).

Figure 4:
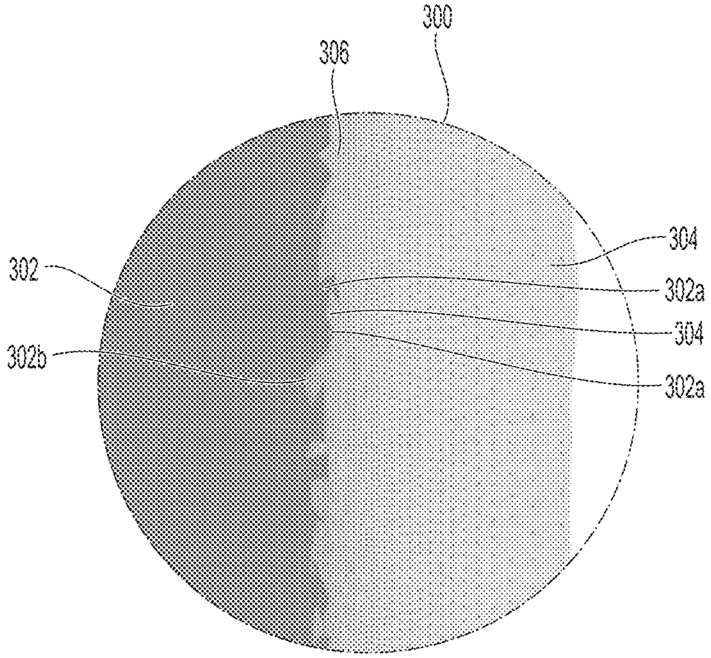
FIG. 4 is detailed view of the cross-section IV in FIG. 3.

Shown in FIG. 4 is a detailed pictorial representation of the preferred gradient material at the microstructural level. Preferably formed between the core 302 and the outer protective layer 304 is a preferred transition region or layer 306 which contains a portion of the core and a portion of the protective layer interlocked with one another to form a permanent bond. In the pictorial representation, the transition bond region includes a portion of the preferred iron alloy core 302 having a plurality of spaced apart structures 302*a* defining a plurality of pores 302*b* in between with a portion of the polymer layer 304 filling the plurality of pores 302*b* such that the polymer layer 304 is permanently bonded to the iron alloy core 302. The layers of the sprinkler frame 110 form a gradient in directions away from transition region 306 with increase in the preferred iron alloy core to one side of the transition region 306 and increase in the protective polymer to the other.

Figure 5:
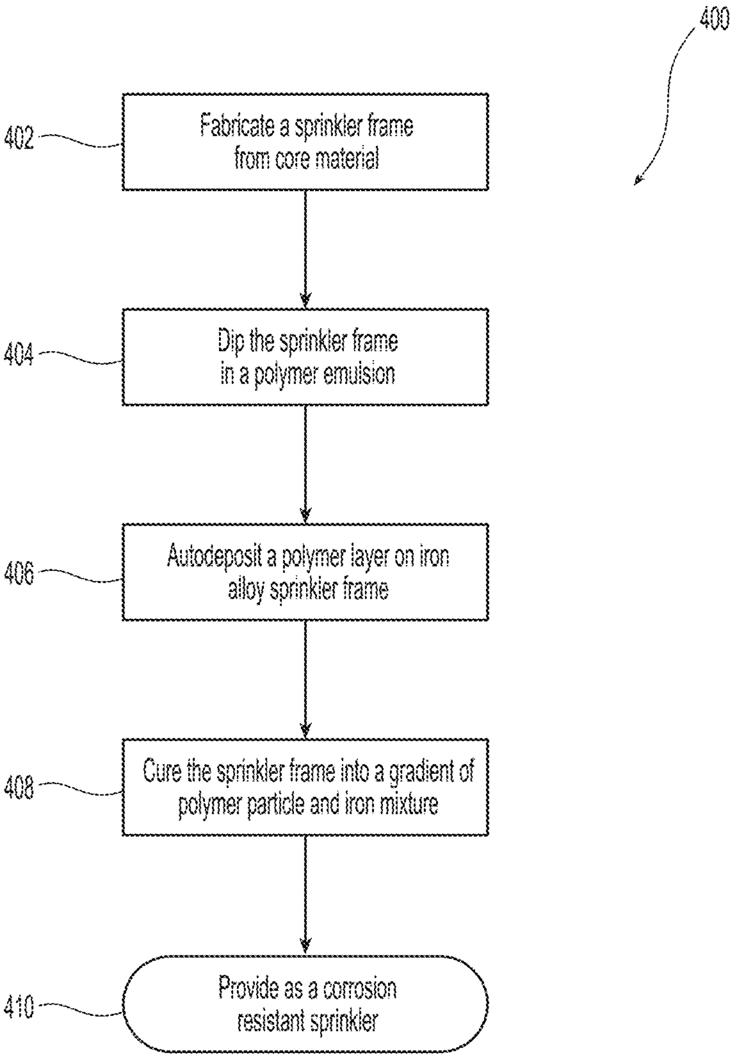
FIG. 5 is a flowchart view of a preferred method of providing a corrosion resistant sprinkler.
Figure 6A:
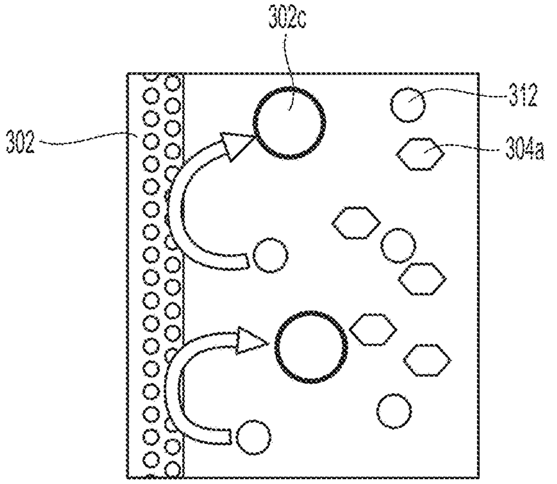
FIGS. 6A-6C are graphic views of the process of FIG. 5.
Figure 6B:
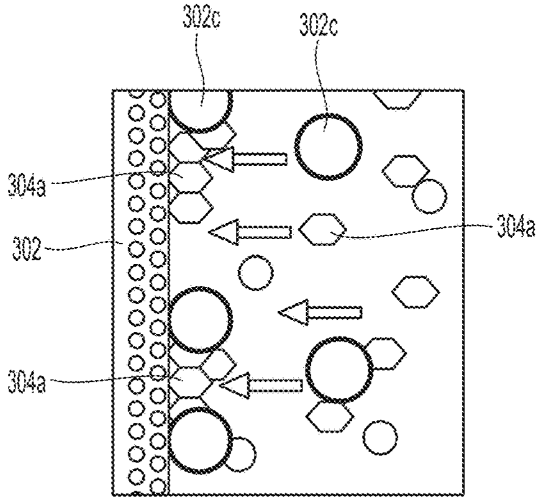
Figure 6C:
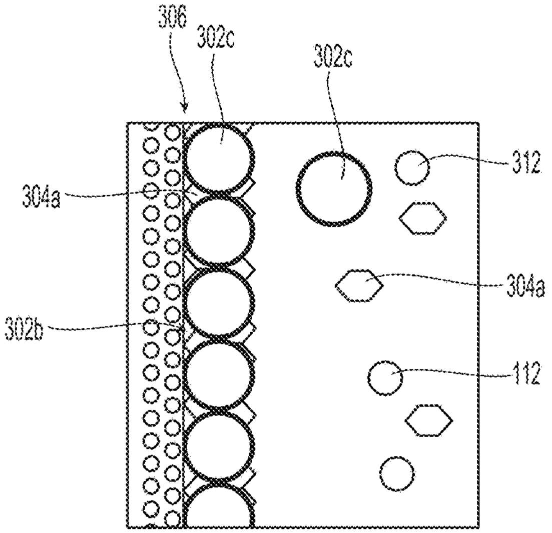

Outlined in FIG. 5 is a preferred method 400 of providing a corrosion resistant gradient material sprinkler 100 that includes in a first step 402 fabricating the sprinkler frame from the core iron alloy, e.g., steel, to define a body having an inlet, an outlet, with a passageway extending between the inlet and the outlet and where desired fabricating the frame with support members and a boss. The fabricated frame is cleaned and degreased to facilitate the preferred interlock and permanent bond with the polymer layer. In a preferred application step 404, the fabricated frame is dipped in a polymer emulsion bath. In a preferred autodeposition step 406, the fabricated frame reacts with polymer emulsion bath to build up and bond the protective polymer layer to the core frame. Graphically shown in FIGS. 6A-6C is a preferred embodiment of the autodeposition process for producing the gradient material sprinkler frame 110. Autodeposition is a chemical process in which an organic polymeric emulsion chemically is deposited on the surface of a clean metal substrate. Details of autodeposition processes to protect a steel substrate is described in U.S. Pat. Nos. 5,385,758 and 8,629,493. A preferred emulsion bath 310 includes iron fluorides 312 with polymer particles 304*a* which form the preferred polymer layer 304. The iron fluorides 312 react with and polarize the steel surface of the core 302 resulting in the production of free iron ions 302*c* from the core. The iron ions 302*c* and polymer particles 304*a* attract and ionically bond to one another to cause the polymer particles to coagulate and settle within the pores between the micro-structures of the steel surface and form the preferred transition region 306. The polymer particles 304*a* continue to precipitate out of the emulsion and build upon one another to form the preferred layer 304. Accordingly, in a preferred embodiment, the preferred protective layer 304 includes polymer particles and iron. As such, a protective polymer layer 304 can be pure polymer or a combination of polymer with particulate of the core material. Referring again to FIG. 5, the dipped assembly is then permitted to cure in a curing step 408. The cured frame 110 can be assembled with the other sprinkler components in a step 410 to provide a preferred corrosion resistant sprinkler. Additionally, or alternatively, a fluid deflecting member 200 can be fabricated from a corrosion-prone core material and subject to the same autodeposition and curing process for assembly in the preferred sprinkler 100.

Figure 7:
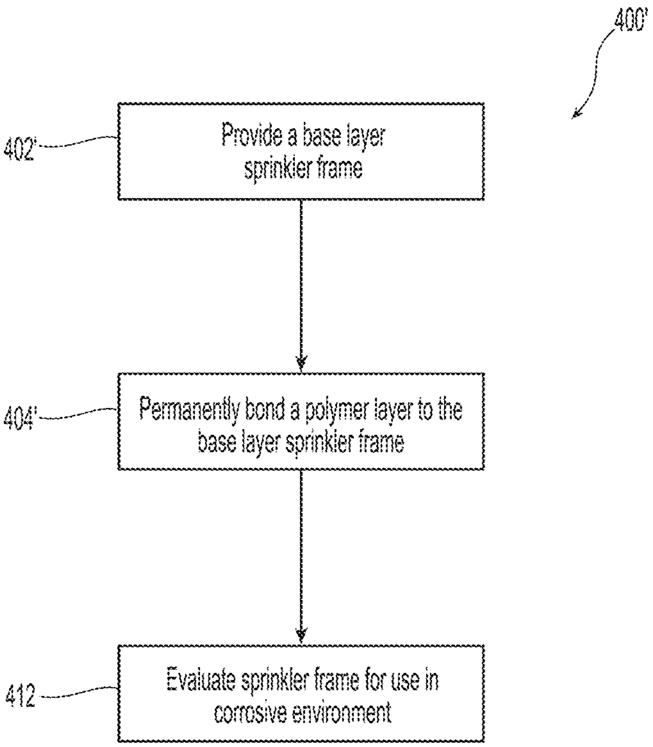
FIG. 7 is a flowchart view of a preferred method of providing a corrosion evaluated, corrosion resistant sprinkler.
Figure 8:
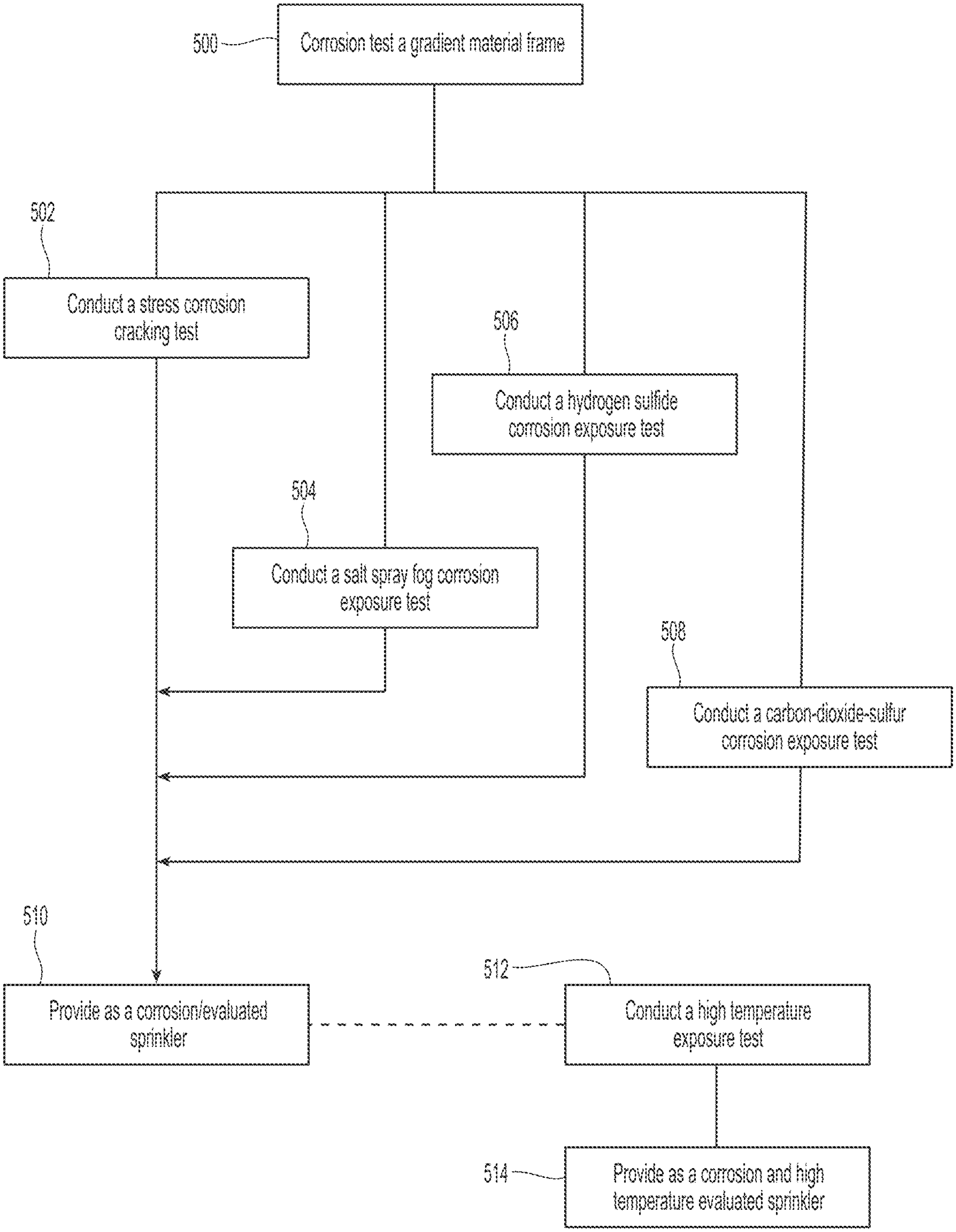
FIG. 8 is a flow chart view of a preferred method of corrosion evaluation.

Outlined in FIG. 7 is a preferred method 400' of obtaining and providing a preferred corrosion resistant and evaluated fire protection sprinkler in which the frame 110 is fabricated 402' from a base layer and to which the polymer layer is permanently bonded 404' in a preferred manner as previously described. One or more of the sprinkler frames 110 are tested alone, in combination with a preferred corrosion resistant fluid deflector member(s) 200, or in the full sprinkler assembly 100, in one or more corrosion evaluation tests 412 to evaluate the sprinkler frame suitability for use in a corrosive environment. In FIG. 8 is a preferred method protocol 500 or for evaluating the preferred corrosion resistant sprinkler 100 that includes conducting a stress corrosion test 502 and more preferably includes subjecting the sprinkler frame 110 and the preferred sprinkler assembly 100 or components thereof subsequently or independently to one or more exposure corrosion tests (504, 506, 508). Because of the permanent bond between the core and the protective layer, the corrosion testing of the gradient material does not involve removal or separation of the polymer layer from the core. Thus, the preferred method includes a gradient material corrosion testing protocol in which the complete gradient material frame and/or deflector is tested as a whole.

In one preferred method 500 of evaluating the preferred sprinkler assembly 100, the sprinkler frame satisfies a stress corrosion cracking test 502 in which the gradient material frame 110 is exposed to a corrosive atmosphere within a test chamber that is either one of a moist ammonia air mixture or a forty-two percent (42%) by weight magnesium chloride solution for a period of exposure such that the sprinkler frame and the protective layer do not show cracking or delamination. In the case of the moist ammonia air mixture, the mixture is provided by a sufficient amount of aqueous ammonia to cover the bottom of the test chamber with a specific gravity of 0.94 at an atmospheric pressure with a constant temperature of about 93° F. Alternatively, or additionally, the frame 110 is exposed to a corrosive atmosphere being one of a moist ammonia air mixture or a forty-two percent (42%) by weight magnesium chloride solution for a period of exposure and the sprinkler frame withstands flowing water at the rated pressure of the frame for thirty (30) minutes. A preferred magnesium chloride solution is maintained at a boiling temperature of about 302° F. The sprinkler frames are preferably placed within the magnesium chloride solution and exposed for a period of 150 hours when intended for normal use and exposed for 500 hours when intended for use without a corrosion resistant coating. Following the exposure period, the test samples are rinsed and examined under microscope. For any parts not showing cracking, delamination or other degradation the samples pass the stress corrosion cracking. Additionally, the tested frame can be assembled into the complete sprinkler assembly and hydrostatically tested to verify that a hydrostatic test pressure of 7 psig. can be maintained. By passing one or more stress corrosion tests, the preferred sprinkler 10 and its frame satisfy the stress corrosion cracking testing requirements.

Referring again to FIG. 8, the method of corrosion evaluation 500 can include exposing the gradient material sprinkler frame 110, within the complete preferred sprinkler assembly 10, for a period of time to a corrosive environment and subsequently testing the exposed sprinklers for acceptable performance. The exposure tests can include one or more of the following: a salt spray fog corrosion exposure test 504, a hydrogen sulfide atmosphere corrosion exposure test 506, and a carbon dioxide-sulfur dioxide atmosphere corrosion exposure test 508. In one embodiment of the exposure tests, the internal passageway of the sprinkler assembly 10 is filled with de-ionized water and sealed for the period of exposure. Alternatively, the sprinkler assembly 10 can be tested without filling the passageway and sealing the inlet. The period of exposure to the testing environment is one or both of a ten-day (10-day) period and thirty-day (30-day) period. Following the period of exposure, the test sprinklers are evaluated for proper operation within defined parameters to determine whether or not the tested sprinkler is suitable for use in a corrosive environment. In particular, the exposed sprinkler is to be tested to verify that the thermal sensitivity of the sprinkler remains within acceptable levels. In order to satisfy the 10-day test, the tested sprinkler is thermally operated to verify that average time to operation following the 10-day exposure has not exceeded more than 1.3 times the time to operation for the same sprinkler not exposed to the test environment. Similarly, in satisfaction of the 30-day test, the tested sprinkler is thermally operated to verify that average time to operation following a 30-day exposure has not exceed more than 1.3 times the time to operation for the same sprinkler not exposed to the test environment.

In a preferred salt spray corrosion exposure test 504, the test sprinkler 10 is exposed to a salt spray for fog as specified in a Standard Practice for Operating Salt Spray (Fog) Testing Apparatus, ASTM B117, with the salt solution consisting of 20 percent by weight of common salt (sodium chloride). In the sulfide exposure test 506, a moist hydrogen sulfide air mixture is provided in a closed glass chamber maintained at about 75° F. (24° C.) in which an amount of hydrogen sulfide equivalent to one percent (1.0%) of the volume of the chamber is introduced into the chamber on five out of every seven days of the period of exposure with the prior day's air mixture being purged from the chamber prior to introduction of new volume. To maintain the humidity of the chamber, an amount of water equivalent to 10 ml/0.003 $m^3$ of chamber volume is maintained at the bottom of the chamber. In the carbon dioxide-sulfur dioxide exposure test 508, a moist carbon dioxide-sulfur dioxide air mixture is provided in a closed glass chamber maintained at about 75° F. (24° C.) in which an amount of carbon dioxide equivalent to one percent (1.0%) of the volume of the chamber plus an amount of sulfur dioxide equivalent to one percent (1.0%) of the volume of the chamber is introduced into the chamber on five out of every seven days of the period of exposure with the prior day's air mixture being purged from the chamber prior to introduction of new volume. To maintain the humidity of the chamber, an amount of water equivalent to 10 ml/0.003 $m^3$ of chamber volume is maintained at the bottom of the chamber. By satisfactorily passing the preferred corrosion test 502 alone or in combination with one or more exposure tests, the preferred sprinkler is corrosion evaluated 510 for use in a corrosive environment.

In addition, a gradient material frame and/or deflector can be evaluated for use in a high temperature environment. A preferred method of evaluation includes conducting a high temperature exposure test 512 in which the gradient material frame 110, alone or in an open state of the sprinkler assembly 10, i.e., with the deflector and no trigger or sealing components, is heated within an oven to a temperature of about 1500° F. (1470±20° F.) for fifteen minutes (15 min.) and then subsequently submerged in a water bath of about 75° F. (60±10° F.). A frame 110 or open assembly passing the high temperature exposure test 512 shows no sign of deformation, blistering or fracture following the high temperature exposure and water bath. Accordingly, the preferred methods of testing of the gradient frame and deflector 110/200 and/or sprinkler assembly incorporating such preferred gradient materials, can provide for a corrosion and high temperature evaluated sprinkler assembly for use in corrosive and high temperature environments.

The preferred embodiments of sprinkler assembly and methods of corrosion evaluation can provide for other preferred methods of fire protection. For example, one preferred method includes obtaining a sprinkler frame formed of a gradient material having an iron alloy core, an outer polymer layer defining an external surface of the frame, and a transition bond region between the core and outer layer. The preferred transition bond region including a portion of the iron alloy core having a plurality of spaced apart structures defining a plurality of pores in between with a portion of the polymer layer filling the plurality of pores such that the polymer layer is permanently bonded to the iron alloy core; and satisfying gradient material corrosion testing protocol of the sprinkler. The preferred method can include providing the obtained sprinkler for use in a corrosive environment.

An alternative preferred method of corrosion fire protection can include providing a sprinkler frame formed of a gradient material having an iron alloy core, an outer polymer layer defining an external surface of the frame, and a transition bond region between the core and outer layer, the transition bond region including a portion of the iron alloy core having a plurality of spaced apart structures defining a plurality of pores in between with a portion of the polymer layer filling the plurality of pores such that the polymer layer is permanently bonded to the iron alloy core. The preferred method further includes satisfying corrosion testing of the sprinkler sample size.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of forming a gradient material frame for a sprinkler comprising:

providing a steel sprinkler frame having a body defining an inlet, an outlet, and a passageway extending between the inlet and the outlet along a longitudinal sprinkler axis, the steel frame being made from a corrosion-prone iron alloy;

permanently bonding a polymer layer to the steel frame; and testing the steel frame under a gradient material corrosion testing protocol while the polymer layer is bonded to the steel frame.

2. The method of claim 1, wherein providing the steel sprinkler frame includes fabricating the steel sprinkler frame from the iron alloy and the permanently bonding includes dipping the frame in an emulsion that includes polymer particles.

3. The method of claim 2, wherein the dipping includes reacting the iron alloy with iron fluoride contained in the emulsion to generate free iron ions from a surface of the steel frame.

4. The method of claim 3, wherein the dipping includes coagulating the polymer particles with the free iron ions and mechanically interlocking the coagulated polymer particles with the surface of the steel frame.

5. The method of claim 1, wherein the permanently bonding includes forming an ionic bond between the polymer layer and the steel frame.

6. The method of claim 5, wherein forming the ionic bond between the polymer layer and the steel frame forms a transition region containing a portion of the iron alloy and a portion of the polymer layer.

7. The method of claim 6, wherein the polymer layer comprises a non-porous polymer layer.

8. The method of claim 1, wherein testing the steel frame comprises conducting a stress corrosion cracking test while the polymer layer is bonded to the steel frame.

9. The method of claim 1, wherein testing the steel frame comprises conducting a salt spray fog corrosion exposure test while the polymer layer is bonded to the steel frame.

10. The method of claim 1, wherein testing the steel frame comprises conducting a hydrogen sulfide corrosion exposure test while the polymer layer is bonded to the steel frame.

11. The method of claim 1, wherein testing the steel frame comprises conducting a carbon-dioxide-sulfur corrosion exposure test while the polymer layer is bonded to the steel frame.

12. The method of claim 1, wherein testing the steel frame comprises conducting a high temperature exposure test while the polymer layer is bonded to the steel frame.

* * * * *